(12) United States Patent
Katoh et al.

(10) Patent No.: US 12,548,342 B2
(45) Date of Patent: Feb. 10, 2026

(54) EXTERNAL ENVIRONMENT RECOGNITION DEVICE

(71) Applicant: HITACHI ASTEMO, LTD., Hitachinaka (JP)

(72) Inventors: Shunsuke Katoh, Hitachinaka (JP); Yuki Horita, Tokyo (JP); Gabriel Daniel, Tokyo (JP); Hidehiro Toyoda, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 143 days.

(21) Appl. No.: 18/566,209

(22) PCT Filed: Feb. 15, 2022

(86) PCT No.: PCT/JP2022/005991
§ 371 (c)(1),
(2) Date: Dec. 1, 2023

(87) PCT Pub. No.: WO2023/013110
PCT Pub. Date: Feb. 9, 2023

(65) Prior Publication Data
US 2024/0249528 A1    Jul. 25, 2024

(30) Foreign Application Priority Data
Aug. 6, 2021 (JP) ................................. 2021-129566

(51) Int. Cl.
G06V 20/56 (2022.01)
(52) U.S. Cl.
CPC ................... G06V 20/56 (2022.01)

(58) Field of Classification Search
None
See application file for complete search history.

(56) References Cited

U.S. PATENT DOCUMENTS

2008/0040039 A1   2/2008  Takagi
2016/0350601 A1* 12/2016  Grauer ................. G06V 10/803
(Continued)

FOREIGN PATENT DOCUMENTS

CA    3060925 A1 * 10/2019 ............... G08G 1/16
CN  107730530 A  *  2/2018 ............. G06V 20/42
(Continued)

OTHER PUBLICATIONS

International Search Report with English Translation and Written Opinion of International Patent Application No. PCT/JP2022/005991 dated Apr. 26, 2022 (8 pages).

*Primary Examiner* — Ricky Chin
(74) *Attorney, Agent, or Firm* — Foley & Lardner LLP

(57) ABSTRACT

An external environment recognition device 101 estimates a blind spot region around a host vehicle based on information detected by a sensor that detects a target around the host vehicle. The external environment recognition device 101 includes a visibility index determination unit 121 that calculates a visibility index of the target based on a coordinate point and a reflection intensity of the target detected by the sensor, and assigns the visibility index to a region from the host vehicle 200 to the coordinate point of the target, a visibility map storage unit 124 that stores the visibility index as a visibility map in association with the region, and a blind spot region estimation unit 127 that estimates the blind spot region based on the visibility map.

8 Claims, 14 Drawing Sheets

(56) References Cited

U.S. PATENT DOCUMENTS

| | | | | |
|---|---|---|---|---|
| 2020/0001877 A1* | 1/2020 | Burca | ................. | G01C 21/28 |
| 2022/0314968 A1* | 10/2022 | Horita | ................. | G01S 17/931 |
| 2024/0249528 A1* | 7/2024 | Katoh | ................. | G08G 1/167 |
| 2024/0300523 A1* | 9/2024 | Gabriel | ................. | G08G 1/09 |

FOREIGN PATENT DOCUMENTS

| | | | | |
|---|---|---|---|---|
| EP | 3588006 A1 * | 1/2020 | ...... | B60W 30/18163 |
| EP | 3576973 B1 * | 6/2021 | ............ | B60K 35/80 |
| JP | 2007-310595 A | 11/2007 | | |
| JP | 2020-004144 A | 1/2020 | | |
| JP | 2021047644 A * | 3/2021 | ............ | G08G 1/167 |
| WO | WO-2020241155 A1 * | 12/2020 | ............ | G06V 20/58 |
| WO | WO-2021124794 A1 * | 6/2021 | ............ | F16D 61/00 |
| WO | WO-2021131597 A1 * | 7/2021 | ........ | B60W 50/0097 |

* cited by examiner

EXTERNAL ENVIRONMENT RECOGNITION DEVICE

TECHNICAL FIELD

The present invention relates to an external environment recognition device, and more specifically, relates to an external environment recognition device that is mounted on a vehicle and monitors the periphery of the vehicle to estimate a blind spot region.

BACKGROUND ART

Conventionally, a method of detecting an obstacle around the host vehicle by using a laser radar and estimating a blind spot region caused by the obstacle existing around the host vehicle (for example, PTL 1). In this method, the position of an obstacle on a road surface is detected by the laser radar, a space closer than the detection position on a trajectory of the laser is set as a region in which nothing exists, and a region farther than the detection position is estimated as a blind spot region. By performing this processing on the entire detection range of a sensor, the current surrounding environment can be classified into a free region (region in which no obstacle exists), a region in which an obstacle exists, or a blind spot region that is invisible due to the obstacle.

CITATION LIST

Patent Literature

PTL 1: JP 2007-310595 A

SUMMARY OF INVENTION

Technical Problem

A camera or a radar is mainly used as a sensor mounted in an advanced driving assistance system that realizes collision avoidance with a three-dimensional object, lane change assistance, and the like, which have become widespread in recent years. In particular, for example, only a millimeter-wave radar is generally used as a sensor that detects an obstacle in a space behind the host vehicle. However, such a radar is a sensor having a lower spatial resolution (difficulty in recognizing the shape of an obstacle) than a laser radar such as laser imaging detection and ranging (LIDAR). Therefore, it is difficult to accurately estimate a blind spot region around the host vehicle.

The present invention has been made in view of the above circumstances, and an object of the present invention is to provide means for accurately estimating a blind spot region around a host vehicle even with a sensor having a relatively low spatial resolution and having difficulty in recognizing a shape of an obstacle, and to improve safety and ride comfort of a vehicle equipped with an advanced driving assistance system for collision avoidance, lane change assistance, and the like.

Solution to Problem

According to an aspect of the present disclosure, an external environment recognition device estimates a blind spot region around a host vehicle based on information detected by a sensor that detects a target around the host vehicle. The external environment recognition device includes a visibility index determination unit that calculates a visibility index of the target based on a coordinate point and a reflection intensity of the target detected by the sensor, and assigns the visibility index to a region from the host vehicle to the coordinate point, a visibility map storage unit that stores the visibility index as a visibility map in association with the region, and a blind spot region estimation unit that estimates the blind spot region based on the visibility map.

Advantageous Effects of Invention

According to the above aspect of the present disclosure, even with a sensor having relatively low spatial resolution and having difficulty in recognizing the shape of an obstacle, it is possible to accurately estimate a blind spot region, and it is possible to improve the safety and the ride comfort of a vehicle equipped with an advanced driving assistance system for collision avoidance, lane change assistance, and the like. Further features relating to the present invention will become apparent from the description of the specification and the accompanying drawings. In addition, objects, configurations, and advantageous effects other than those described above will be clarified by the descriptions of the following embodiments.

DESCRIPTION OF EMBODIMENTS

Hereinafter, an embodiment of the present invention will be described in detail with reference to the drawings. Note that, in the present embodiment, a case where the present invention is applied to a lane change assistance system 100 mounted on the host vehicle will be described as an example.

Figure 1:
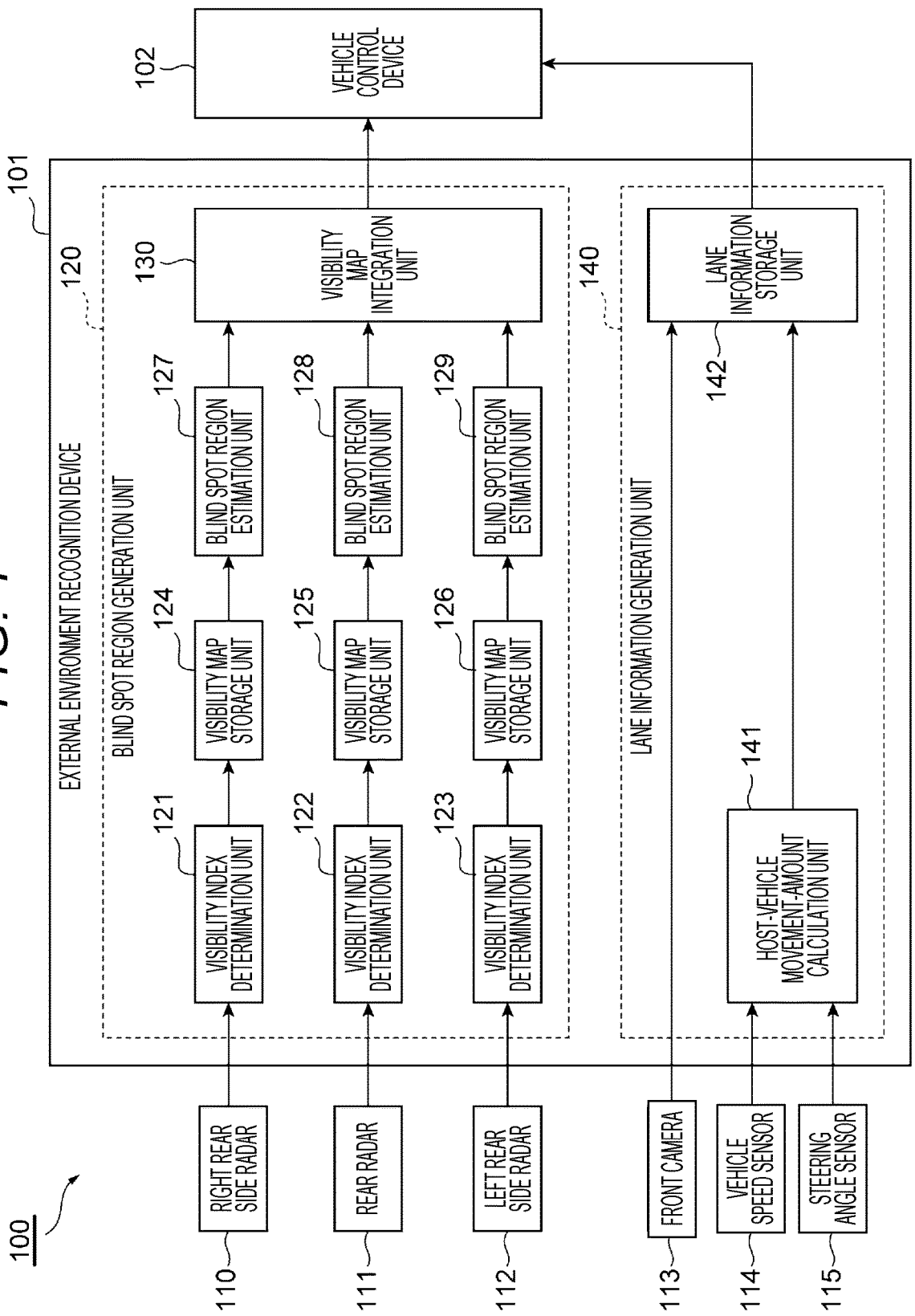
FIG. 1 is a block diagram of a lane change assistance system including an external environment recognition device according to a first embodiment of the present invention.

As illustrated in FIG. 1, a lane change assistance system 100 according to a first embodiment includes a right rear side radar 110, a rear radar 111, and a left rear side radar 112. The radars irradiate the rear of the host vehicle with a detection wave signal such as an electromagnetic wave, and detect the position of the reflected wave as a detection point, based on the reflected wave of the detection wave signal reflected by an object.

In addition, the system 100 includes a front camera 113, a vehicle speed sensor 114, and a steering angle sensor 115. The front camera 113 detects the position of a white line as a detection point based on an image obtained in a manner that an image sensor such as a complementary metal oxide semiconductor (CMOS) or a charge coupled device (CCD) captures an image of the front of the host vehicle. The vehicle speed sensor 114 detects a vehicle speed of the host vehicle. The steering angle sensor 115 detects a steering-wheel steering angle of the host vehicle.

In addition, the system 100 includes an external environment recognition device 101 that recognizes the environment around the host vehicle based on information of the radars 110 to 112, the front camera 113, the vehicle speed sensor 114, and the steering angle sensor 115.

The system 100 further includes a vehicle control device 102 that controls the vehicle based on the external recognition result of the external environment recognition device 101.

The external environment recognition device 101 includes a blind spot region generation unit 120 and a lane information generation unit 140. The blind spot region generation unit 120 generates a blind spot region behind the host vehicle based on information detected by the radars 110 to 112. The lane information generation unit 140 generates lane information ahead of the host vehicle based on information detected by the front camera 113, the vehicle speed sensor 114, and the steering angle sensor 115.

The blind spot region generation unit 120 includes visibility index determination units 121 to 123, visibility map storage units 124 to 126, blind spot region estimation units 127 to 129, and a visibility map integration unit 130. The visibility index determination units 121 to 123 determine a visibility index for each piece of information of the radar. The visibility map storage units 124 to 126 generate and store a visibility map based on the visibility index. The blind spot region estimation units 127 to 129 estimate a blind spot region based on the stored visibility map. When there are a plurality of radars, the visibility map integration unit 130 generates an integrated visibility map by integrating pieces of information included in a plurality of visibility maps generated for pieces of the information of the respective radars. Note that, in the present embodiment, a case where three radars are provided will be described. Depending the configuration of the vehicle, two radars (right rear side radar 110 and left rear side radar 112) or one radar (rear radar 111) may be provided. By using a plurality of radars as in the present embodiment, it is possible to use data captured from different angles, and to improve the accuracy of blind spot region estimation.

The lane information generation unit 140 includes a host-vehicle movement-amount calculation unit 141 and a lane information storage unit 142. The host-vehicle movement-amount calculation unit 141 calculates the movement amount of the host vehicle based on the vehicle speed (m/s) of the host vehicle detected by the vehicle speed sensor 114 and the steering angle (rad) of the steering wheel detected by the steering angle sensor 115. The lane information storage unit 142 acquires a detection point (coordinate point) of a white line in front of the host vehicle, which is recognized by the front camera 113, and performs affine transformation on the detection point of the white line in front of the host vehicle based on the movement amount of the host vehicle. In this manner, the lane information storage unit 142 generates a white line position outside the angle of view of the front camera 113 and stores the white line position as lane information.

The vehicle control device 102 is a control device including, for example, a brake control device, a steering control device, an engine control device, an alarm device, and the like. The vehicle control device 102 controls the vehicle based on an operation by a driver of the vehicle and information transmitted from the blind spot region generation unit 120 and the lane information generation unit 140, and notifies the driver of information required for controlling the vehicle.

Figure 2:
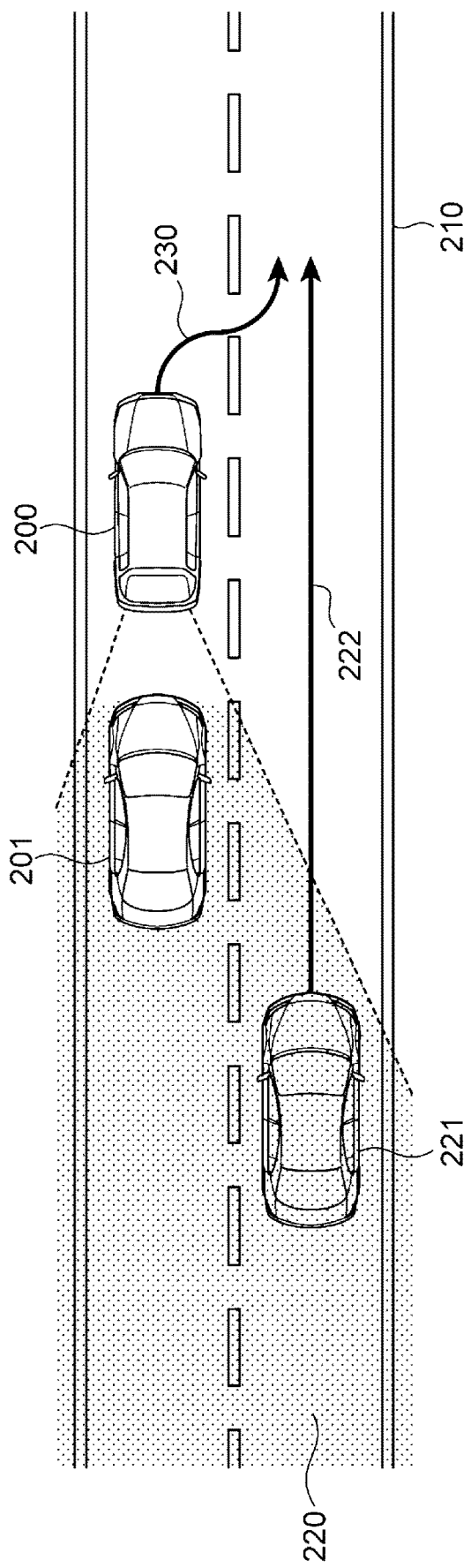
FIG. 2 is a diagram for explaining an example when the external environment recognition device according to the embodiment is applied to the lane change assistance system.

FIG. 2 illustrates an example of a lane change scene in which another rear vehicle 201 behind the host vehicle 200 travels with following the host vehicle and thus there is a blind spot region 220 that cannot be detected by the radar provided in the rear of the host vehicle. The vehicle control device 102 predicts a jumping risk of the other vehicle 221 from the blind spot region of a lane as a lane change destination, based on the blind spot region behind the host vehicle and the lane information, which have been acquired from the external environment recognition device 101. Then, when it is predicted that a predicted jumping trajectory 222 on the assumption that the other vehicle 221 has jumped out of a blind spot region 220 overlaps a lane change trajectory 230 of the host vehicle 200 at the same timing, that is, when a collision between the host vehicle 200 and the other vehicle 221 is predicted, an alarm for notifying the driver of the host vehicle 200 of a risk of collision is issued by voice or the like, or control for reducing the blind spot region of the lane as the lane change destination (for example, moving toward the center of the lane, or the like) is performed.

After it is determined that the predicted jumping trajectory 222 of the other vehicle 221 from the blind spot region of the lane change destination does not overlap the lane change trajectory 230 at the same timing, that is, it is determined that the host vehicle 200 does not collide with the other vehicle 221 as described above, a lane change assistance process is executed. As described above, the external environment recognition device 101 accurately detects the blind spot region behind the host vehicle, which has a possibility that another vehicle exists, whereby the vehicle control device 102 can perform appropriate vehicle control.

Figure 3:
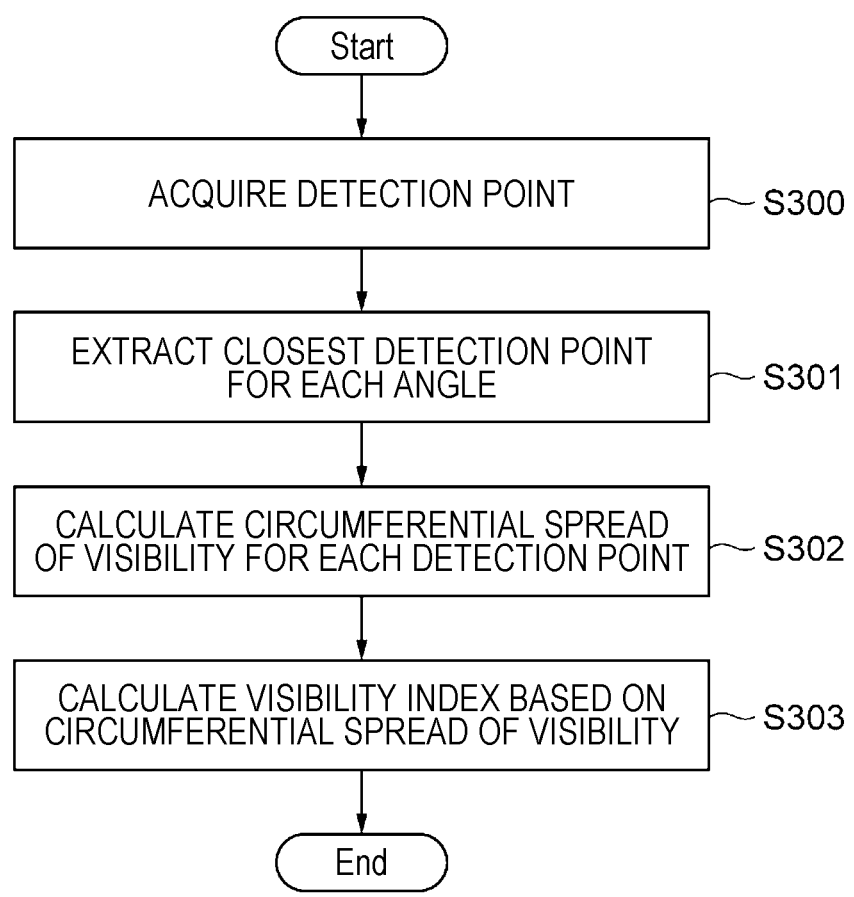
FIG. 3 is a diagram illustrating a flowchart of a process executed by a visibility index determination unit.
Figure 6:
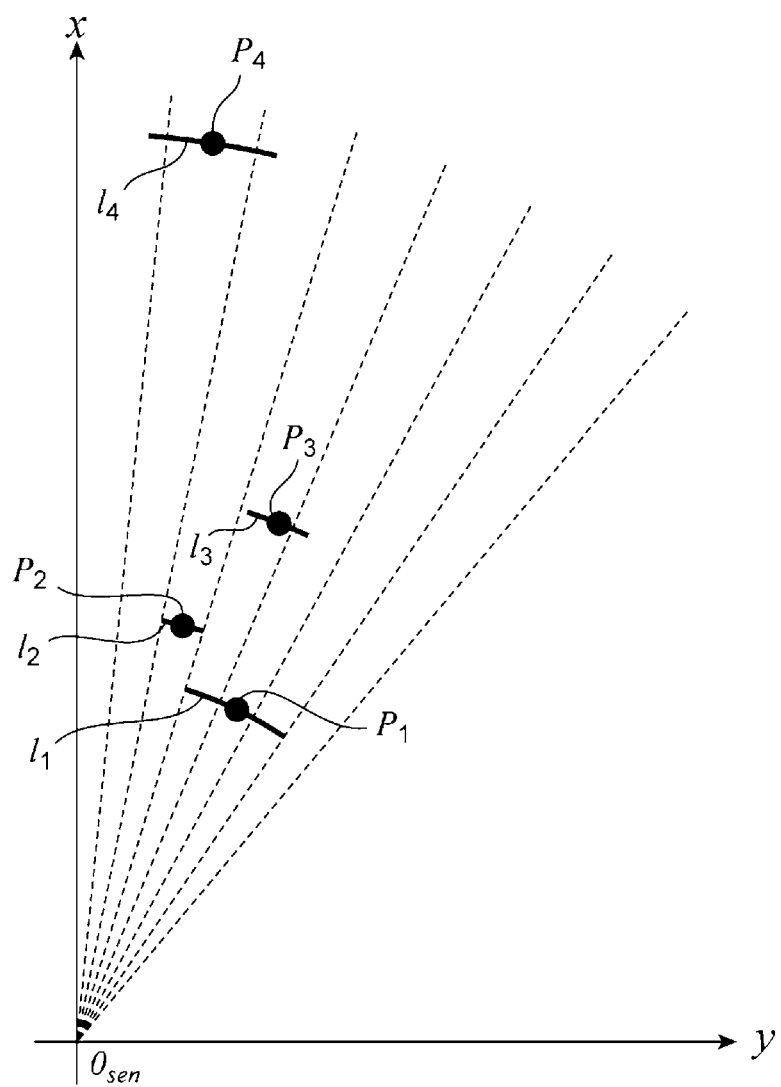
FIG. 6 is a diagram for explaining the process executed in Step S302 in FIG. 3, similarly to FIG. 5.
Figure 7:
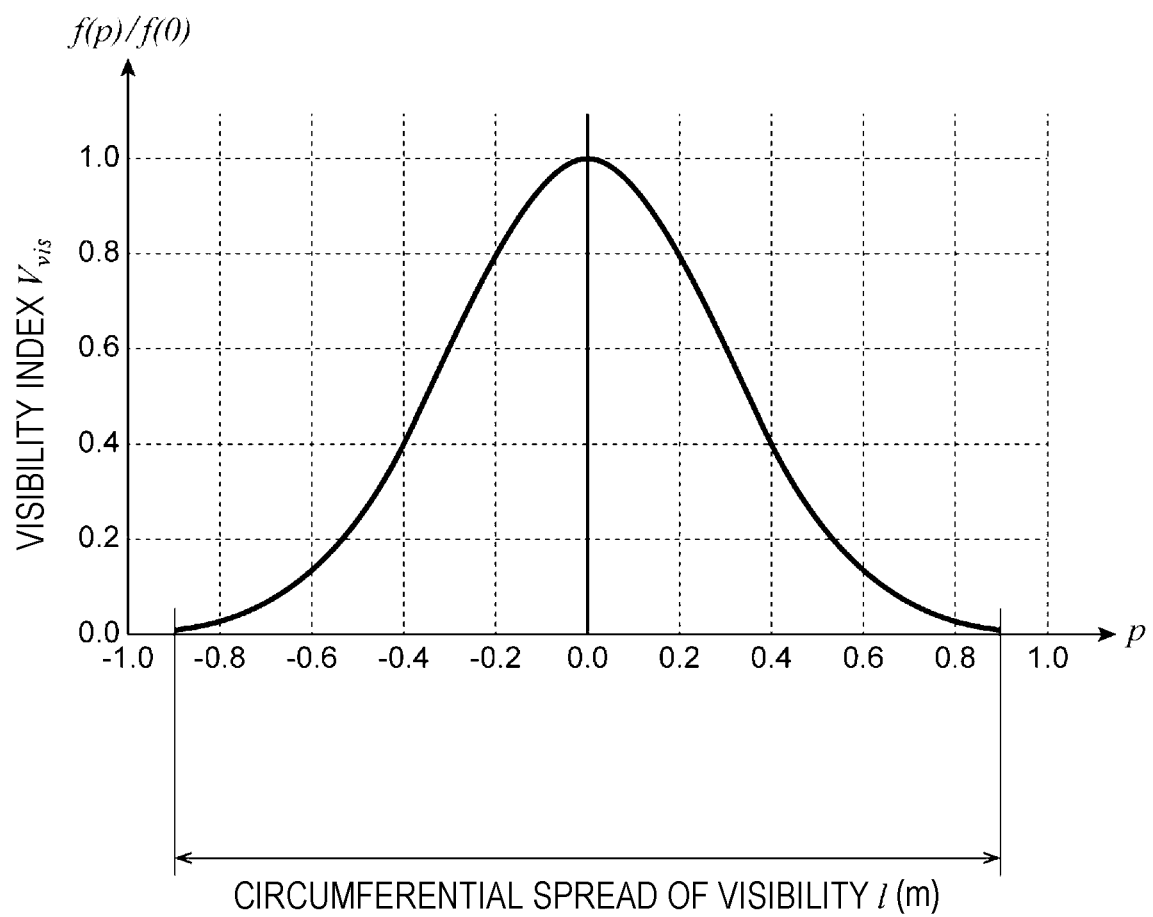
FIG. 7 is a diagram for explaining a process executed in Step S303 in FIG. 3.
Figure 8:
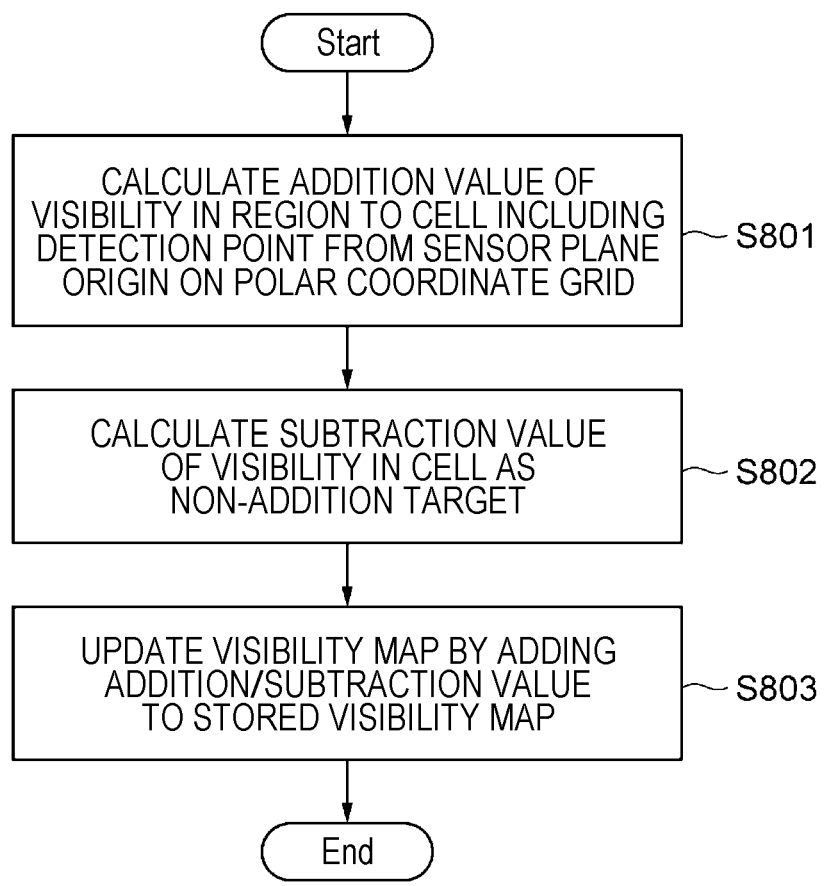
FIG. 8 is a diagram illustrating a flowchart of a process executed by a visibility map storage unit.
Figure 12:
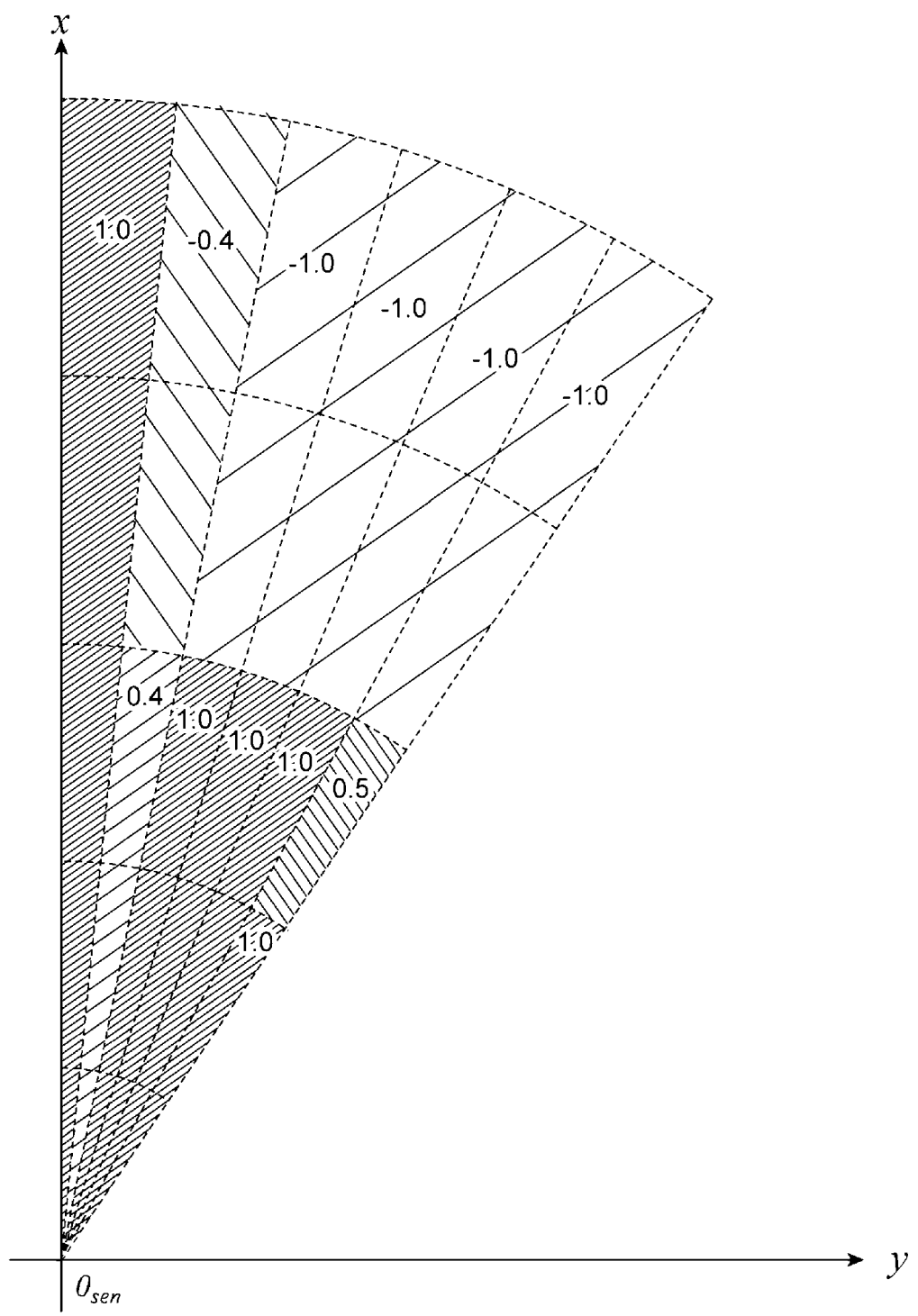
FIG. 12 is a diagram for explaining a process in which a blind spot region estimation unit estimates a blind spot region.
Figure 13:
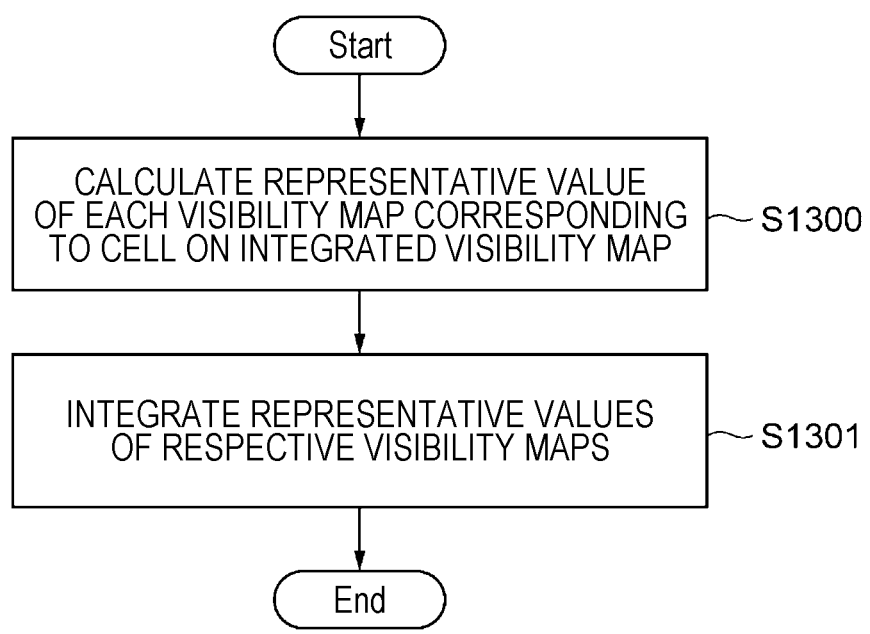
FIG. 13 is a diagram illustrating a flowchart of a process executed by a visibility map integration unit.

Next, a process executed by the blind spot region generation unit 120 according to the present invention will be described with reference to FIGS. 3 to 14. Note that FIGS. 3, 8, and 13 are examples of a flowchart illustrating the process executed by the blind spot region generation unit 120. More specifically, FIG. 3 illustrates an example of a process executed by the visibility index determination units 121 to 123. FIG. 8 is an example of a process executed by the visibility map storage units 124 to 126. FIG. 13 is an example of a process executed by the visibility map integration unit 130. The blind spot region generation unit 120 repeatedly executes processes of Step S300 to Step S303, Step S801 to Step S803, and Step S1300 to Step S1301 described later, as one cycle.

Note that processes executed by the visibility index determination units 121 to 123, the visibility map storage units 124 to 126, and the blind spot region estimation units 127 to 129 are similar to the above processes. Therefore, for the details of the processes, an example in which the process in the visibility index determination unit 121 is executed based on the information of the right rear side radar 110, then, the process in the visibility map storage unit 124 is executed, the process in the blind spot region estimation unit 127 is executed, and finally, the process in the visibility map integration unit 130 is executed will be described in detail.

FIG. 3 is a flowchart illustrating the process executed by the visibility index determination unit 121. In Step S300, the visibility index determination unit 121 acquires detection information regarding a target detected by the radar, from the right rear side radar 110. The detection information includes information on a detection point indicating a reflection position of an electromagnetic wave emitted from the radar. Specifically, the detection information includes a coordinate point of the target and a radar reflection cross-sectional area. Here, the radar reflection cross-sectional area with respect to the target is an index represented by using a scattering field re-emitted by a current induced when radio waves from the sensor are incident on the target. The radar reflection cross-sectional area basically indicates a constant value regardless of a distance in a case of the same object. In general, the radar reflection cross-sectional area is proportional to the size of the target. Note that, in the present specification, the reflection cross-sectional area may be referred to as a reflection intensity.

Figure 4:
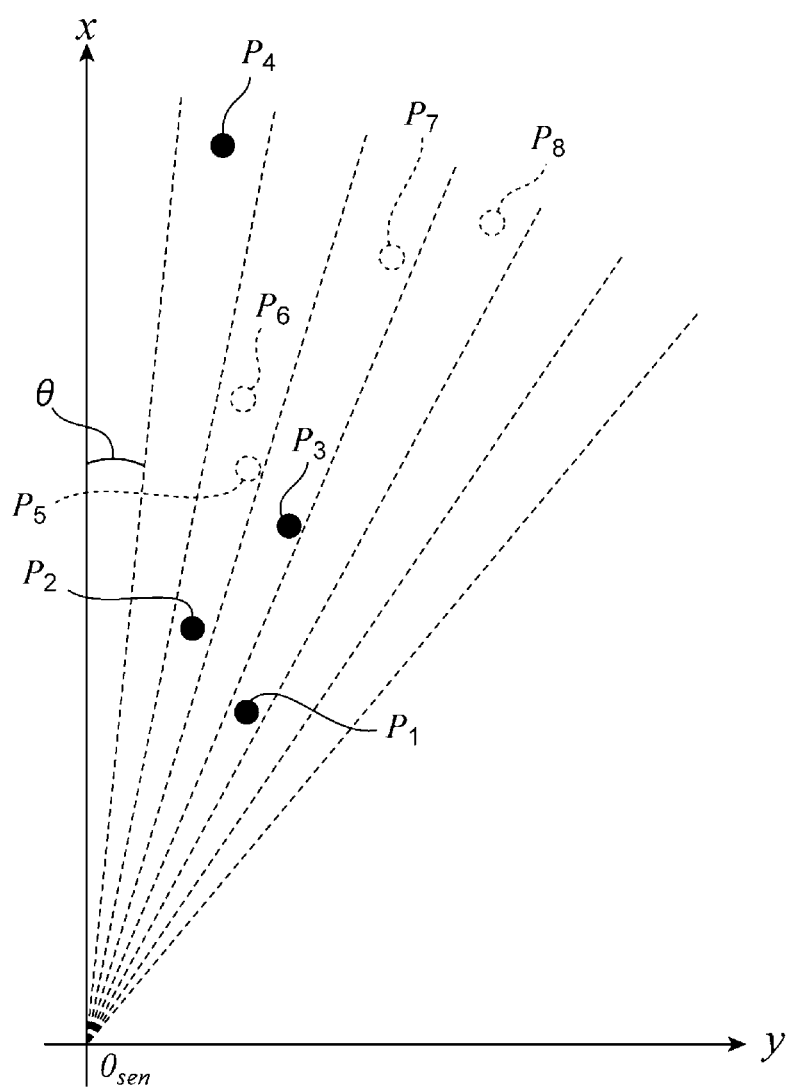
FIG. 4 is a diagram for explaining a process executed in Step S301 in FIG. 3.
Figure 9:
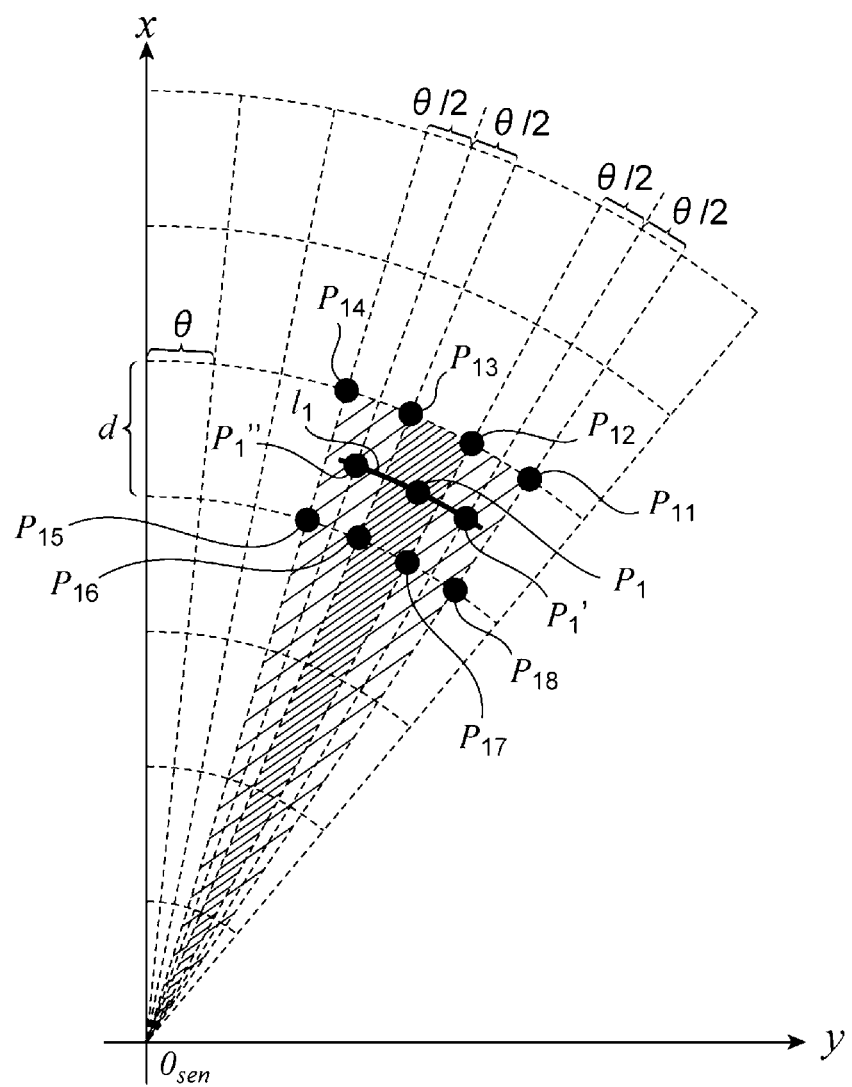
FIG. 9 is a diagram for explaining a process executed in Step S801 in FIG. 8.
Figure 10:
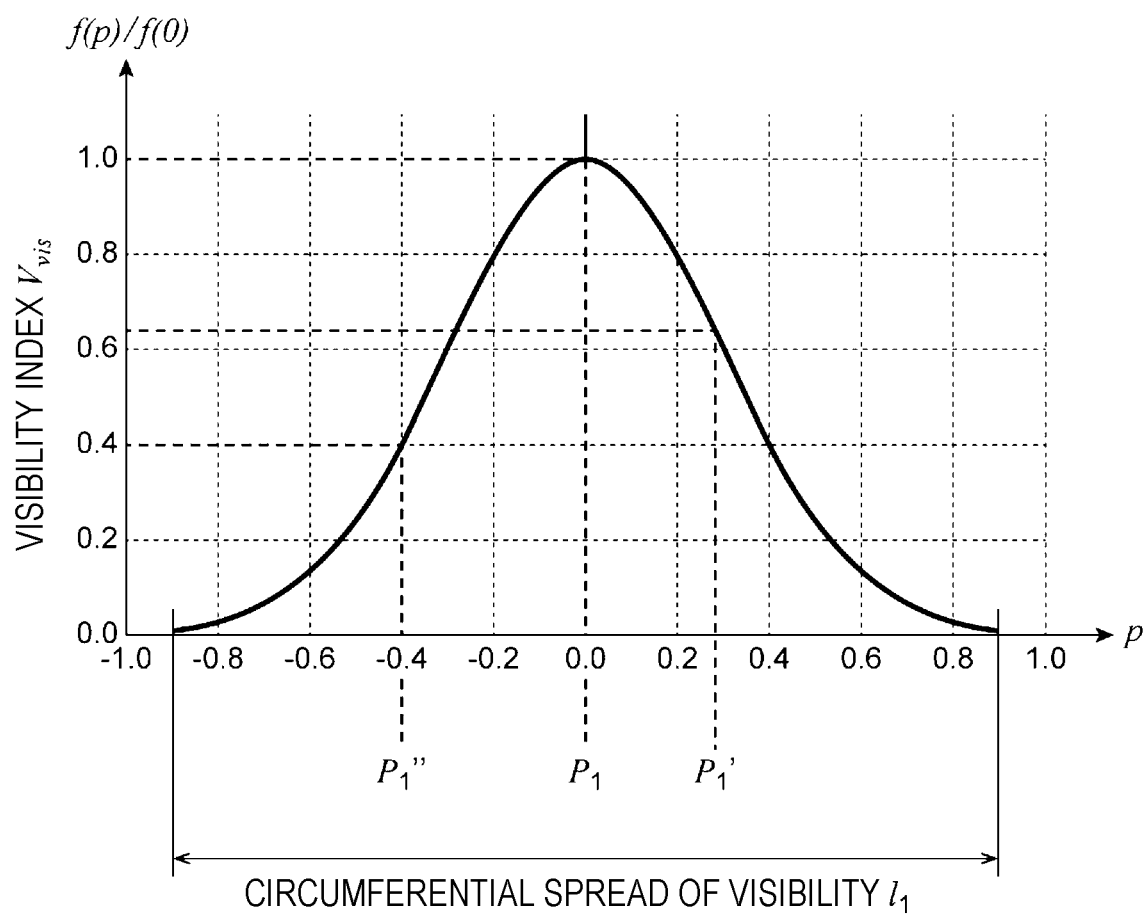
FIG. 10 is a diagram for explaining the process executed in Step S801 in FIG. 8, similarly to FIG. 9.

Here, the blind spot region generation unit 120 stores polar coordinate plane data with a sensor plane as illustrated in FIG. 4, as an origin. The polar coordinate plane includes regions divided by a predetermined circumferential angle θ with an origin $O_{sen}$ as a reference. Further, as will be described in detail later, as illustrated in FIG. 9, the regions may include a cell group further divided by a predetermined radial distance d with the origin as the reference. The coordinate point of the target acquired by the right rear side radar 110 is loaded on the polar coordinate plane data, as illustrated in FIG. 4.

In Step S301, the visibility index determination unit 121 extracts a detection point closest to the origin $O_{sen}$ for each region divided at each constant angle θ from the origin $O_{sen}$, and stores information on the detection point (coordinate point and radar reflection cross-sectional area). For example, as illustrated in FIG. 4, when a plurality of detection points $P_k$ (k=1, 2, . . . , 8) are obtained, the detection point $P_i$ (i=1, 2, 3, 4) closer to the origin $O_{sen}$ is stored in each region, and the detection point $P_j$ (j=5, 6, 7, 8) farther from the origin $O_{sen}$ than the detection point $P_i$ (i=1, 2, 3, 4) is removed in the same region. Note that this process is executed by a ray casting processing unit mounted in the visibility index determination unit 121. Then, as will be described in detail later, the visibility index determination unit 121 assigns the visibility index to a region up to the detection point $P_i$ (i=1, 2, 3, 4) closest to the origin $O_{sen}$.

With this configuration, it is not necessary to execute any process on the detection point $P_j$ (j=5, 6, 7, 8) farther from the origin $O_{sen}$, so that it is possible to improve work efficiency.

Figure 5:
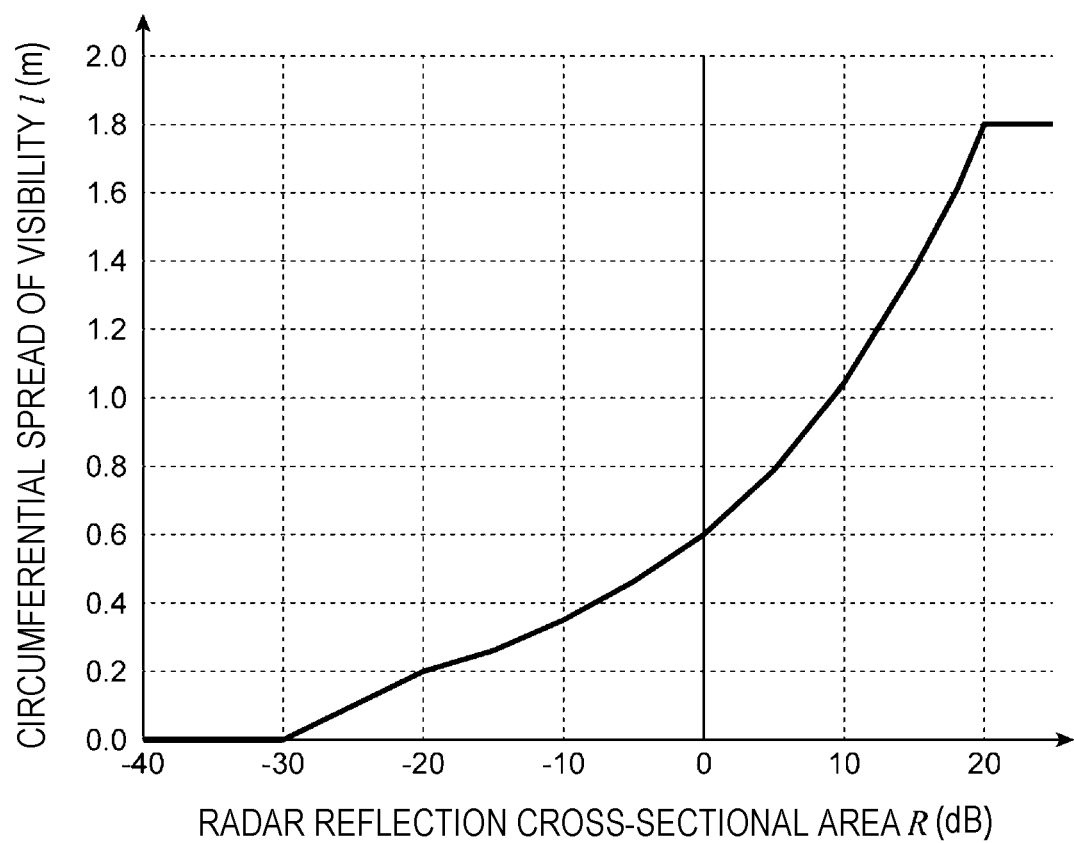
FIG. 5 is a diagram for explaining a process executed in Step S302 in FIG. 3.

In Step S302, the visibility index determination unit 121 calculates a circumferential spread l of the visibility in a circumferential direction centered on the origin $O_{sen}$, based on the radar reflection cross-sectional area of the stored detection point. For example, as illustrated in FIG. 5, the circumferential spread l (m) of the visibility with respect to the radar reflection cross-sectional area R (dB) may be calculated by using a lookup table in which numerical values of the reflection cross-sectional areas of various targets are recorded. In addition, the circumferential spread of the visibility here is, for example, a length $l_i$ (i=1, 2, 3, 4) of an arc centered on the origin $O_{sen}$, as illustrated in FIG. 6.

In Step S303, the visibility index determination unit 121 calculates a visibility index $V_{vis}$ based on the circumferential spread l of the visibility at each detection point. Specifically, a normal distribution in which 3σ=½ and μ=0 is calculated by the following formula.

$$f(p) = \frac{1}{\sqrt{2\pi\sigma}} \exp\left(-\frac{(p-\mu)^2}{2\sigma^2}\right) \qquad \text{[Math. 1]}$$

Then, the calculated normal distribution is divided and normalized by a f (0) value so that the maximum value of the visibility index is 1. For example, when the circumferential spread l of the visibility of the detected target is 1.8 (m), the normalized normal distribution illustrated in FIG. 7 is calculated. That is, this means that the visibility index at the position of the detection point (p=0) is the largest, and the visibility index decreases as the distance from the detection point increases in the circumferential direction.

FIG. 8 is a flowchart illustrating the process executed by the visibility map storage unit 124. The visibility map storage unit 124 stores a polar coordinate grid map including a cell group divided by an angle θ in the circumferential direction and a length d in a radial direction as illustrated in FIG. 9.

In Step S801, the visibility map storage unit 124 calculates an addition value of the visibility index of a region from the origin $O_{sen}$ to a cell including each detection point on the polar coordinate grid map, based on the visibility index of each detection point calculated in Step S303.

Specifically, for example, as illustrated in FIG. 9, when the detection point $P_1$ exists in a region $P_{12}P_{13}P_{16}P_{17}$, the visibility index $V_{vis}$=1.0 when P=0 is set as the addition value in a cell group of a fan shape $O_{sen}P_{12}P_{13}$. Further, if an intersection of a bisector of <$P_{11}O_{sen}P_{12}$ and an arc $l_i$ is set as $P_i'$, a visibility index at a position corresponding to the length of an arc $P_iP_i'$ is set as an addition value in a cell group of a fan shape $O_{sen}P_{11}P_{12}$. Similarly, when an intersection of a bisector of <$P_{13}O_{sen}P_{14}$ and the arc $l_i$ is set as $P_i''$, a visibility index at a position corresponding to the length of an arc $P_iP_i''$ is set as an addition value in a cell group of a fan shape $O_{sen}P_{13}P_{14}$ (see FIG. 10).

As described above, the blind spot region estimation unit 127 according to the present embodiment changes the range of the region to which the visibility index is assigned, based on the radar reflection cross-sectional area (reflection intensity) of the target detected by the radar 110. With this configuration, it is possible to correctly evaluate the influence of each target having a different radar reflection cross-sectional area (reflection intensity), and it is possible to more accurately estimate the blind spot.

Figure 11:
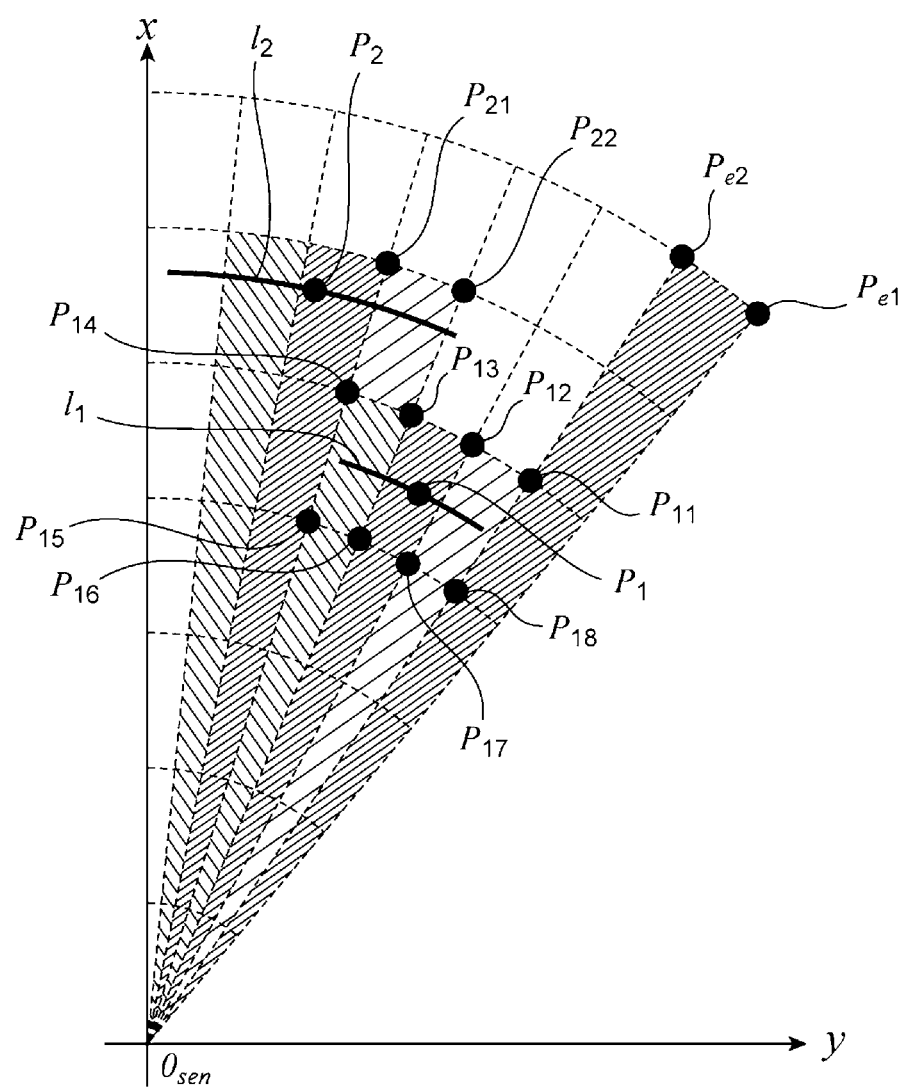
FIG. 11 is a diagram for explaining the process executed in Step S801 in FIG. 8, similarly to FIGS. 9 and 10.

Furthermore, for example, as illustrated in FIG. 11, when there is a region $O_{sen}P_{13}P_{14}$ in which a region for setting the addition value of the visibility index based on the detection point $P_1$ overlaps a region for setting the addition value of the visibility based on the detection point $P_2$, a value obtained by adding the addition value of the visibility calculated based on the detection point $P_1$ and the addition value of the visibility calculated based on the detection point $P_2$ is set as the addition value of the visibility in the region $O_{sen}P_{13}P_{14}$. However, the maximum value of the addition value of the visibility, which is to be set, is limited to 1. Further, in a region $O_{sen}P_{e1}P_{e2}$ in which the detection point does not exist and the addition value of the visibility is not set, it is determined that there is a high possibility of a free region in which no obstacle exists within the detectable range of the sensor in the region, and 1 is set as the addition value of the visibility.

As described above, when there is a cell to which a plurality of visibility indexes are determined to be assigned, in a region to which the cell belongs in a plurality of cell groups, the visibility map storage unit 124 according to the present embodiment adds and assigns the plurality of visibility indexes to the cell. As a result, even when there are a plurality of targets on the visibility map, it is possible to correctly apply the influence of the visibility index by each target to each cell, and it is possible to more accurately estimate the blind spot region.

In Step S802, the visibility map storage unit 124 sets a subtraction value of the visibility index for the cell for which the addition value of the visibility index has not been set in Step S801. Specifically, for each region $O_{sen}P_{e1}P_{ei+1}$ (i=0, 1, 2, ..., n), the maximum value $V_{max}$ of the addition value of the visibility set for the cell group belonging to the region is extracted, and $-1 \times V_{max}$ is set as the subtraction value of the visibility for the cell for which the addition value in the same region is not set. In other words, a negative visibility index serving as a measure for adjusting the estimation degree of the blind spot region is assigned to a cell group farther from the origin than a cell to which a positive visibility index is assigned.

In this manner, it is possible to accumulate information in consideration of time series, and it is possible to perform robust blind spot region estimation excluding the influence of noise that occurs instantaneously.

In Step S803, the visibility map storage unit 124 adds the addition value of the visibility and the subtraction value of the visibility, which have been calculated in Steps S801 and S802, to the visibility map stored one cycle before. Note that, in the present embodiment, the accumulation minimum value of the visibility addition value is set to 0, and the accumulation maximum value thereof is set to 15.

Then, the blind spot region estimation unit 127 estimates a blind spot around the host vehicle based on the visibility map stored and updated as described above. Specifically, for the visibility map stored and updated by the visibility map storage unit 124 as illustrated in FIG. 12, it is determined that a cell to which a negative visibility index having a large absolute value is assigned has a higher possibility of a blind spot, and conversely, a cell to which a negative visibility index having a small absolute value is assigned has a lower possibility of a blind spot. In addition, a cell to which the visibility index of 0 or a positive visibility index is assigned is determined not to be a blind spot.

In other words, the operation of the blind spot region estimation unit 127 described above is as follows. That is, the external environment recognition device 101 according to the present embodiment loads the coordinate point detected by the sensor, on the polar coordinate plane data with the sensor plane as the origin, which is stored in the external environment recognition device. The polar coordinate plane includes a cell group divided by a predetermined circumferential angle and a predetermined radial distance with the origin as the reference. Then, the blind spot region estimation unit 127 estimates a region farther from the origin than the cell to which the visibility index is assigned, as the blind spot region.

As described above, in the present embodiment, the region detectable by the radar is divided into a plurality of cells in order to estimate the blind spot region. Therefore, it is possible to estimate more accurately the blind spot region in both the circumferential direction and the radial direction.

Figure 14:
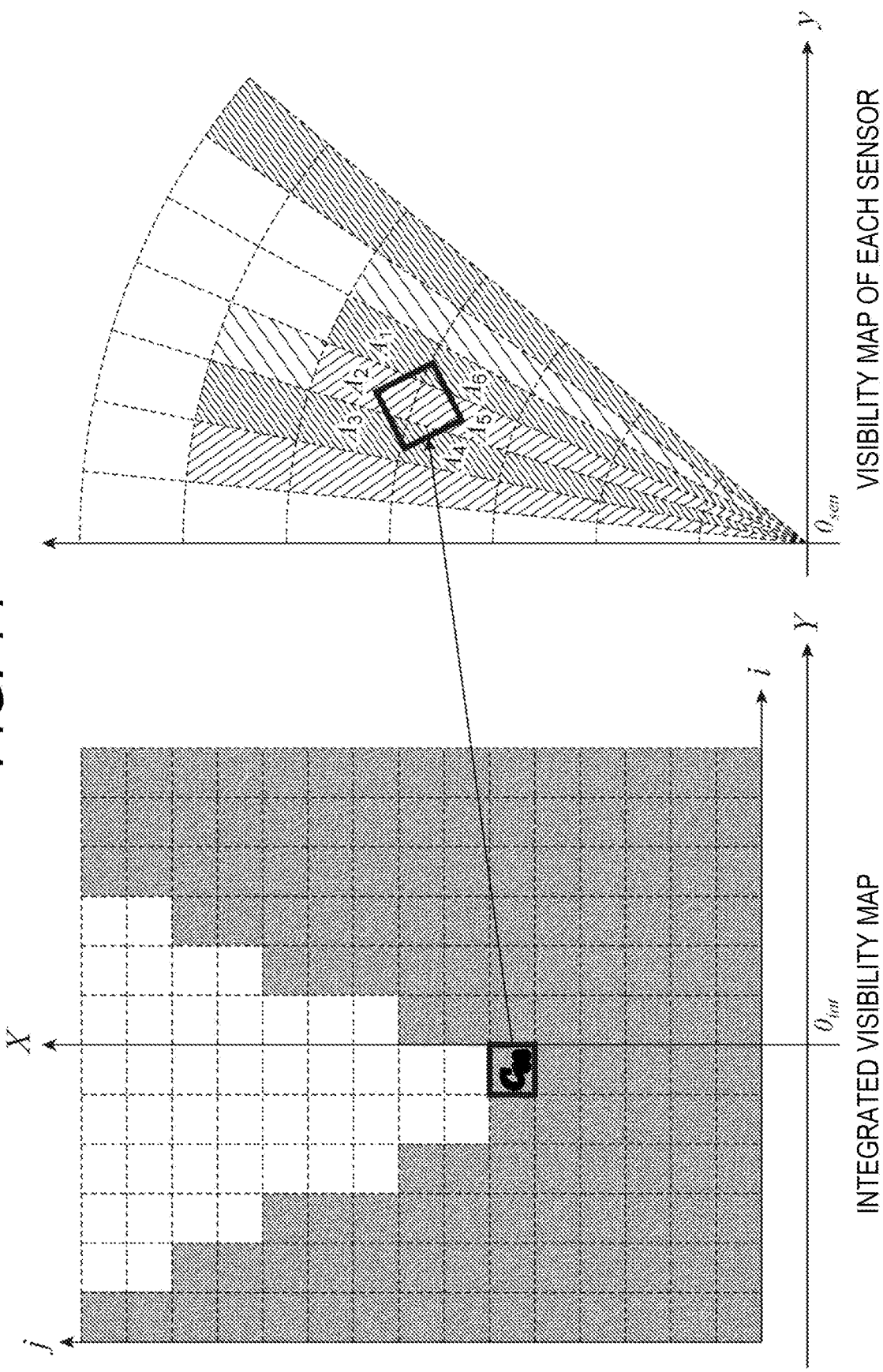
FIG. 14 is a diagram for explaining a process executed in Step S1300 in FIG. 13.

FIG. 13 is a flowchart illustrating the process executed by the visibility map integration unit 130. The visibility map integration unit 130 stores an orthogonal coordinate grid map (integrated visibility map below) with the center of the rear wheel axle as the origin $O_{sen}$, as illustrated in FIG. 14. The visibility map integration unit 130 executes a process of integrating the visibility maps stored in the polar coordinate grid map of the sensor plane origin center of each of the right rear side radar 110, the rear radar 111, and the left rear side radar 112 into the orthogonal coordinate grid map.

In Step S1300, the visibility map integration unit 130 calculates a representative value of the visibility map of each sensor corresponding to each cell on the integrated visibility map. Specifically, for example, as illustrated in FIG. 14, four vertex coordinates of a cell $C_{66}$ on the integrated visibility map that is an orthogonal coordinate system are affine-transformed into coordinates of each sensor on the visibility map that is a polar coordinate system. Then, a cell group $A_1A_2A_3A_4A_5A_6$ on the visibility map including a straight line connecting the transformed vertexes of the cell is extracted, and the average value of the visibility index values set for the extracted cell group $A_1A_2A_3A_4A_5A_6$ is set as the representative value. In the present embodiment, this process is executed on three visibility maps.

In Step S1301, the visibility map integration unit 130 selects the smallest value from three representative values calculated in Step S1300 and sets the selected value in the cell of the integrated grid map.

As described above, selection of the smallest (positive) value from the plurality of representative values and generation of the integrated visibility map means that the absolute value of the negative visibility index assigned to the cell group farther from the origin than cells to which the above values are assigned is also reduced. This means that each cell is less likely to be estimated to be a blind spot region. Therefore, as compared with a case where a large value is selected from a plurality of representative values, it is possible to avoid unnecessary determination of each cell as a blind spot region, and it is possible to reduce the burden on the vehicle control device.

As described above based on the embodiment, the blind spot region generation unit 120 can accurately estimate the blind spot region around the host vehicle with a sensor having a relatively low spatial resolution and having a difficulty in recognizing the shape of the obstacle, and can improve the safety and the ride comfort of the vehicle equipped with the advanced driving assistance system for lane change assistance or the like.

Hitherto, one embodiment of the present invention has been described in detail above, but the present invention is not limited to the above-described embodiment, and includes various modifications. For example, the above embodiment is described in detail in order to explain the present invention in an easy-to-understand manner, and the above embodiment is not necessarily limited to a case including all the described configurations. Some or all of the configurations, functions, processing units, processing means, and the like may be realized in hardware by being designed with an integrated circuit, for example. Further, the above-described respective components, functions, and the like may be realized by software by the processor interpreting and executing a program for realizing the respective functions. Information such as a program, a table, and a file, that realizes each function can be stored in a memory, a recording medium such as a hard disk and a solid state drive (SSD), or a recording medium such as an IC card, an SD card, and a DVD.

REFERENCE SIGNS LIST 101 external environment recognition device
110 right rear side radar
111 rear radar
112 left rear side radar
120 blind spot region generation unit
121 visibility index determination unit that assigns visibility index based on detection information of right rear side radar
122 visibility index determination unit that assigns visibility index based on detection information of rear radar
123 visibility index determination unit that assigns visibility index based on detection information of left rear side radar
124 visibility map storage unit that stores visibility map of right rear side radar
125 visibility map storage unit that stores visibility map of rear radar
126 visibility map storage unit that stores visibility map of left rear side radar
127 blind spot region estimation unit that estimates blind spot region based on visibility map stored in visibility map storage unit of right rear side radar
128 blind spot region estimation unit that estimates blind spot region based on visibility map stored in visibility map storage unit of rear radar
129 blind spot region estimation unit that estimates blind spot region based on visibility map stored in visibility map storage unit of left rear side radar
130 visibility map integration unit that integrates visibility map of right rear side radar, visibility map of rear radar, and visibility map of left rear side radar
200 host vehicle
220 blind spot region

The invention claimed is:

1. An external environment recognition device that estimates a blind spot region around a host vehicle based on information detected by a sensor that detects a target around the host vehicle, the external environment recognition device comprising:
one or more processors configured to:
calculate a visibility index of the target based on a coordinate point and a reflection intensity of the target detected by the sensor, and assigns the visibility index to a region from the host vehicle to the coordinate point of the target;
store the visibility index as a visibility map in association with the region; and
estimate the blind spot region based on the visibility map.

2. The external environment recognition device according to claim 1, wherein the one or more processors are further configured to:
load the coordinate point detected by the sensor on polar coordinate plane data that is stored in the external environment recognition device and
use a sensor plane as an origin,
wherein the polar coordinate plane is configured by a cell group divided by a predetermined circumferential angle and a predetermined radial distance with the origin as a reference, and
estimate, as the blind spot region, a region farther from the origin than a cell to which the visibility index is assigned.

3. The external environment recognition device according to claim 1, wherein the one or more processors are further configured to:
change a range of the region to which the visibility index is assigned, based on the reflection intensity.

4. The external environment recognition device according to claim 1, wherein the one or more processors are further configured to:
extract a coordinate point having a short distance to a position of the host vehicle among one or a plurality of the coordinate points detected by the sensor, and
assign the visibility index to a region from the host vehicle to the extracted coordinate point.

5. The external environment recognition device according to claim 1, wherein the one or more processors are further configured to:
receive signals from a plurality of sensors,
generate the visibility map for each of the plurality of sensors, and
generate an integrated visibility map by integrating pieces of information included in a plurality of the visibility maps generated for the plurality of respective sensors.

6. The external environment recognition device according to claim 2, wherein the one or more processors are further configured to:
assign the visibility index to a cell group from one or a plurality of coordinate points detected in the cell group divided for each predetermined circumferential angle from the origin to a cell to which one coordinate point closest to the host vehicle belongs.

7. The external environment recognition device according to claim 6, wherein the one or more processors are further configured to:
assign the visibility index having a negative value to a cell group farther from the host vehicle than a cell group to which the visibility index is assigned among cell groups separated from the origin at every predetermined circumferential angle, and
adjust an estimation degree of the blind spot region in accordance with the visibility index having the negative value.

8. The external environment recognition device according to claim 6, wherein, the one or more processors are further configured to:
in response to determining that a plurality of visibility indexes are available to be assigned to a cell, in a region to which the cell belongs in the cell group, add and assign the plurality of visibility indexes to the cell.

* * * * *